March 31, 1970

D. R. SMITH 3,503,181

DEVICE FOR HEAT SEALING WRAPPERS IN A CIGAR OVERWRAPPING
AND BANDING MACHINE

Original Filed July 26, 1965

INVENTOR.
Dale R. Smith

FIG. 2

March 31, 1970     D. R. SMITH     3,503,181
DEVICE FOR HEAT SEALING WRAPPERS IN A CIGAR OVERWRAPPING AND BANDING MACHINE
Original Filed July 26, 1965     11 Sheets-Sheet 5

INVENTOR.
Dale R. Smith,

FIG_7_

United States Patent Office
3,503,181
Patented Mar. 31, 1970

1

3,503,181
DEVICE FOR HEAT SEALING WRAPPERS IN A CIGAR OVERWRAPPING AND BANDING MACHINE
Dale R. Smith, York, Pa., assignor to York Production Engineering Co., Inc., Windsor, Pa., a corporation of Pennsylvania
Original application July 26, 1965, Ser. No. 474,754, now Patent No. 3,441,616, dated Nov. 19, 1968. Divided and this application Oct. 4, 1967, Ser. No. 706,729
Int. Cl. B65b 7/18, 51/32
U.S. Cl. 53—379    4 Claims

ABSTRACT OF THE DISCLOSURE

In a cigar overwrapping and banding machine, automatic means are provided for heat sealing the folded ends of the wrapper which extend beyond the two ends of the cigar. The jaws of the heat sealing mechanism have an upstream section and a downstream section. The jaws of the upstream section close upon each other to form a horizontal heat seal. The jaws of the downstream section close upon each other to change the horizontal seal to a vertical seal and to further heat seal the vertical seal. Both sections of the jaws are advanced downstream at the same speed as the cigars are advancing. The jaws then open and return upstream. The jaws then close. The jaws of the upstream section close on a new cigar wrapper end fold. The downstream section jaws close on a wrapper end which has been previously heat sealed by the upstream jaws.

---

This application is a division of application Ser. No. 474,754, filed July 26, 1965 by Dale R. Smith, entitled "Cigar Overwrapping and Banding Machine," now U.S. Patent 3,441,616, issued Nov. 19, 1968.

The present invention relates generally to improvements in machines for wrapping cigars and particularly to improvements in a cigar overwrapping and banding machine.

The object of the present invention is to provide, in a cigar overwrapping and banding machine, means for heat sealing the folded ends of the wrapper which project beyond both ends of the cigar.

Other objects of the invention will become apparent when the following description is read with reference to the accompanying drawings, wherein.

As previously indicated, the present application is a division of parent application Ser. No. 474,754, filed July 26, 1965, now U.S. Patent 3,441,616, issued Nov. 19, 1968. The parent application describes a machine for wrapping cigars and includes means for advancing the cigars in a steady stream over an infeed platform, then successively elevating the cigars one at a time from the infeed platform to the higher level of the discharge platform, and then advancing the cigars in a steady stream over the discharge platform. The wrapper is folded about the cigar at the elevator position. Means for feeding a web of cellophane (or similar material) to the wrapping position are described and claimed in divisional application, Ser. No. 706,726, filed Oct. 4, 1967, U.S. Patent 3,463,413 having an issue date of Aug. 26, 1969. Means for handling the leading end of the wrapper are described and claimed in divisional application Ser. No. 706,727, filed Oct. 4, 1967, U.S. Patent 3,463,375, having an issue date of Aug. 26, 1969. Means for folding the ends of the wrappers is described and claimed in divisional application, Ser. No. 706,728, filed Oct. 4, 1967, U.S. Patent 3,452,516, issued July 1, 1969. The present divisional application describes and claims means for heat sealing the folded ends of the wrappers which project beyond the end of the cigar. The disclosures in the parent application and in the other three divisional applications identified above are incorporated into this divisional application by reference.

Referring particularly to FIGURES 1, 3, 7, 14, 15 and 17, the machine is also provided with a pair of sealing units, generally designated 564, located respectively on opposite sides of the discharge platform. Each sealing unit comprises a bracket 566 affixed to the frame 10 and carrying a pin 568. Slidably fitted over the pin 568 is a sleeve 570. Rockably mounted upon the sleeve is a split hub 572 which has a lateral extension 574. Integrally formed with the extension 574 is a heater body 576 housing an electric heating unit 578. The heater body mounts a jaw 580. Also extending laterally from the split hub 572 is an arm 582 carrying a roller 584 which engages a cam 586 affixed to the plate 34. Fitted over the sleeve 570 is a gear 588 affixed to the split hub 572 for movement therewith about the sleeve 570.

Figure 14:
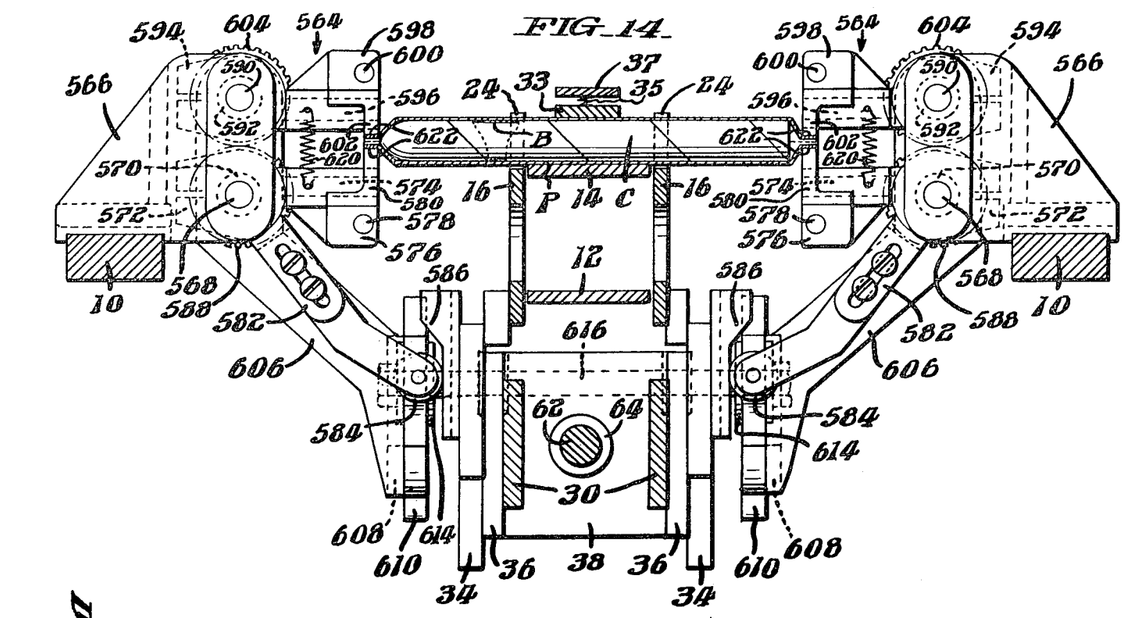
FIGS. 14–17 illustrate the mechanism for heat sealing the folded ends of the wrapper which project beyond each end of the cigar.
Figure 17:
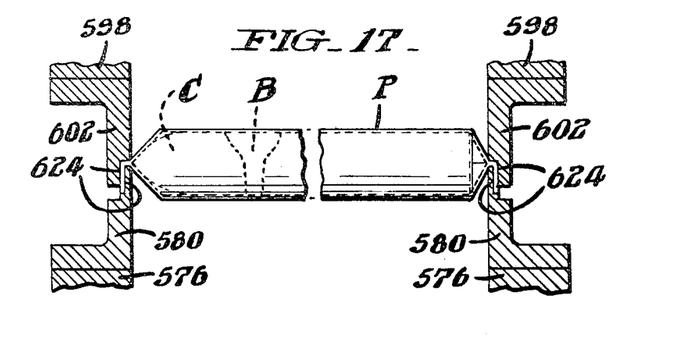

Also carried by the bracket 566 is a pin 590 over which is fitted a sleeve 592. Fitted over the sleeve is a split hub 594 provided with a lateral extension 596. Integrally formed with the extension is a heater body 598 housing an electric heating unit 600. The heater body mounts a jaw 602. Mounted upon the sleeve 592 is a gear 604 which meshes with the gear 588. Fitted over the sleeves 570 and 592 is an arm 606 having a lateral extension 608 which overlies a plate 610 provided with an elongated slot 612. Fitted in the elongated slot is a flanged roller 614 carried by a pin 616 in turn carried by plates 36. The upper and lower sections of the unit are biased toward one another by a tension spring 620. One section of the jaws 580 and 602 is provided with straight sealing surfaces 622, as shown in FIGURE 14. Another section is provided with angular sealing surfaces 624, as shown in FIGURE 17.

Figure 15:
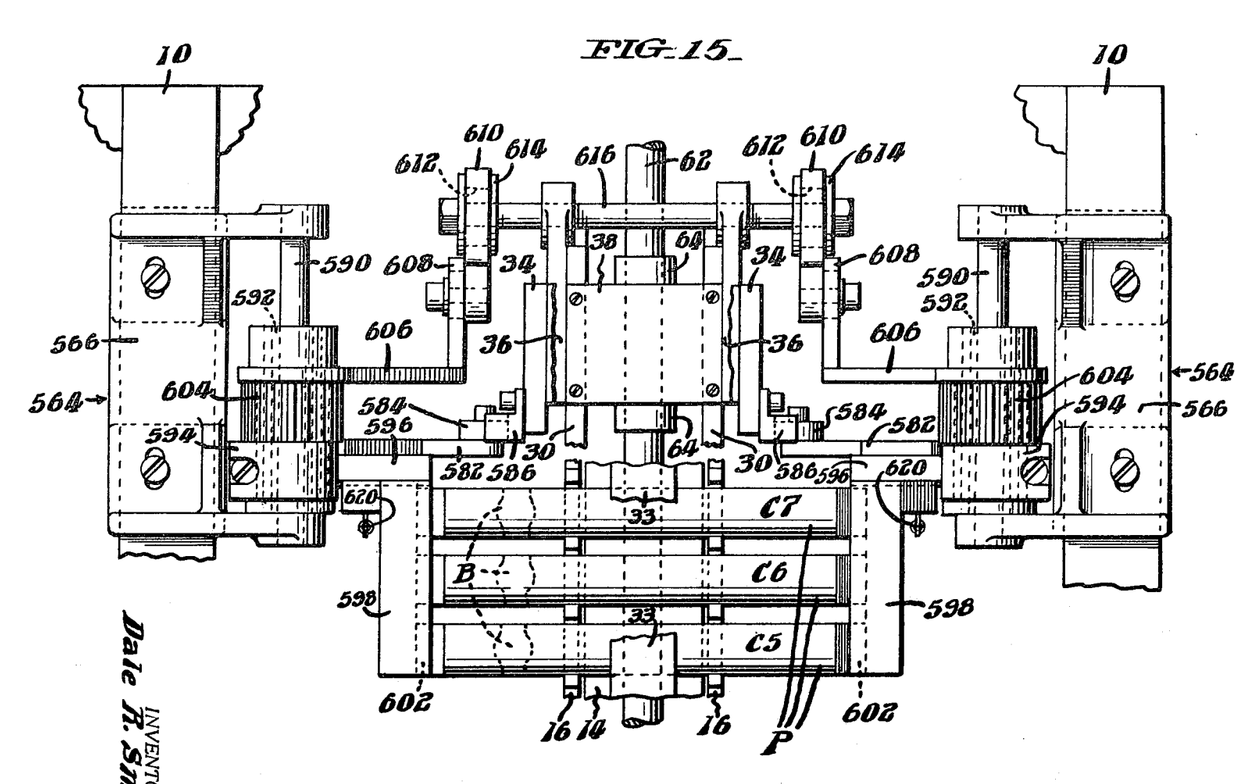
Figure 16:
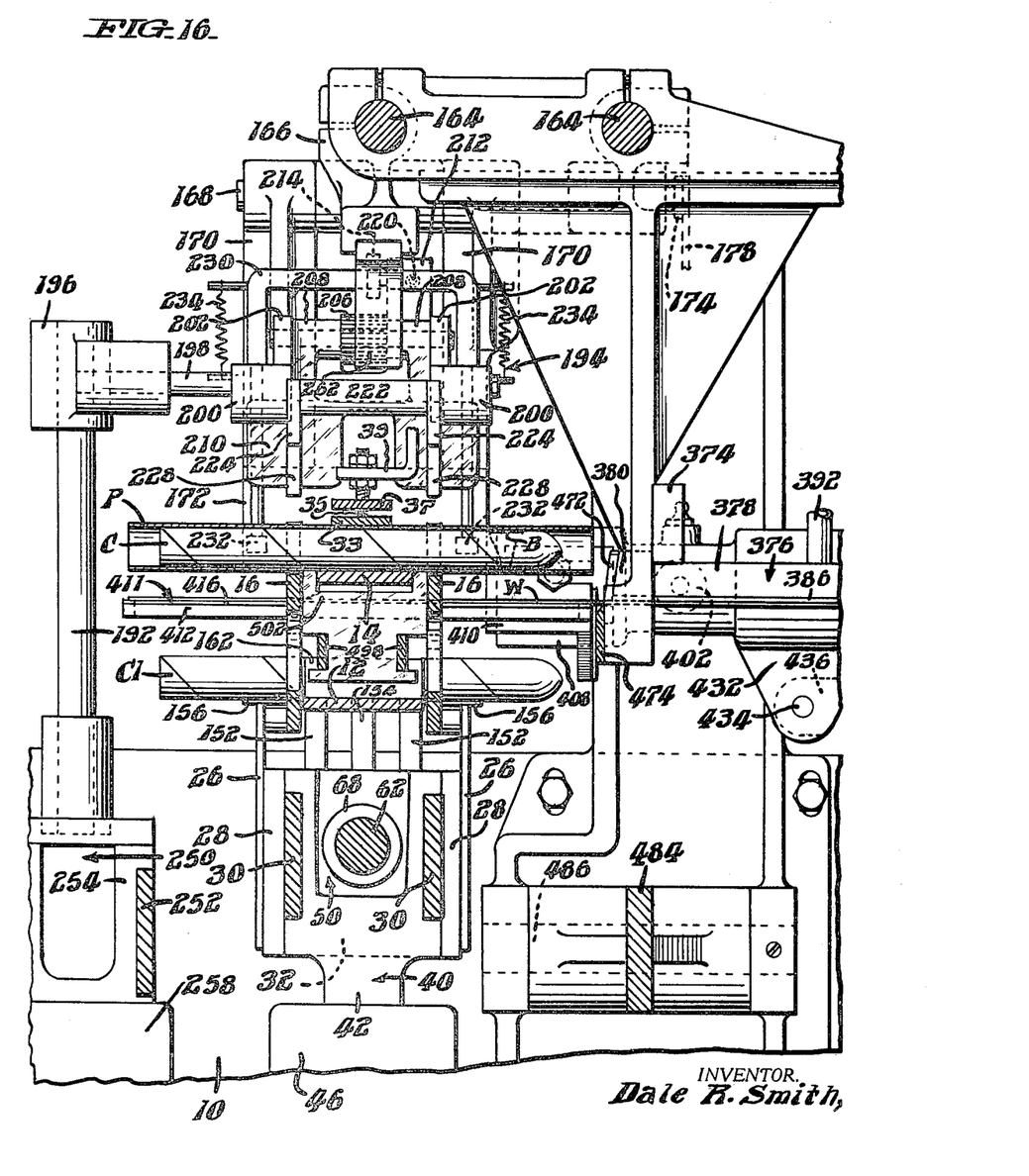

Referring to FIGURE 14, and particularly to the sealing unit on the right, during the first one-quarter cycle, the frame 40 lowers cam 586, which engages roller 584 and swings arm 582, split hub 572, extension 574, heater body 576 and jaw 580 counterclockwise about the sleeve 570. Gear 588 turns counterclockwise and turns gear 604 clockwise. Thus split hub 594, extension 596, heater body 598 and jaws 602 are swung clockwise about sleeve 592. The jaws 580 and 602, therefore, open. During the second one-quarter cycle, the cam follower frame 50, already in lowered position, is retracted, whereupon the entire sealing unit is shifted from the position of FIGURES 1 and 7 to that of FIGURES 3 and 15, the sealing jaws remaining open. During the third one-quarter cycle, frame 40 raises cam 586, which disengages from roller 584. Thus arm 582, split hub 572, extension 574, heater body 576 and sealing jaw 580 swing clockwise about sleeve 570. Gear 588 turns clockwise and turns gear 604 counterclockwise. Thus split hub 594, extension 596, heater body 598 and sealing jaw 602 are swung counterclockwise about sleeve 592. The jaws 580 and 602, therefore, close on the ends of three wrappers (FIGURE 15). During the fourth one-quarter cycle, the cam follower frame 50, already raised, is extended, whereupon the sealing unit is shifted from the position of FIGURES 3 and 14 back to that of FIGURES 1 and 7, the initial position, the sealing jaws remaining closed.

Each end of each cigar wrapper passes progressively through the associated sealing unit in three successive cycles from the position of C5 to the position of C6 to the position of C7 (FIGURE 15). In the position of C5, the ends are sealed, as shown in FIGURE 14. In the positions C6 and C7, the ends are folded over and sealed, as shown in FIGURE 17.

Referring particularly to FIGURES 8 to 13, a roller 626 engaging the cam 130 is carried by one end of a lever 628 pivoted on shaft 124. The lever is biased in clockwise direction (FIGURE 9) by a spring 629. The free end of the lever is pivoted, as at 630, to the lower extremity of a clevis 632. The upper end of the clevis is pivoted, as at 634, to an upright shaft 636 slidably received by a sleeve 638 carried by the frame 10. Affixed to the head of the shaft 636 is a heater body, designated 640, housing an electric heating unit 642. Adjustably mounted upon opposite ends of the heater 640 are a pair of blocks 644. One of the blocks carries a bar 646 and the other a bar 648. In transverse section the bar 648 is sloped, as at 650, and the bar 646 is sloped, as at 652. The heater 640 is provided with a pair of laterally spaced, transverse grooves 654, which accommodate narrow fingers 660 formed by recesses 658 in a plate 656. The plate 656 is carried by a pair of brackets 662 affixed to the frame 10.

Figure 1:
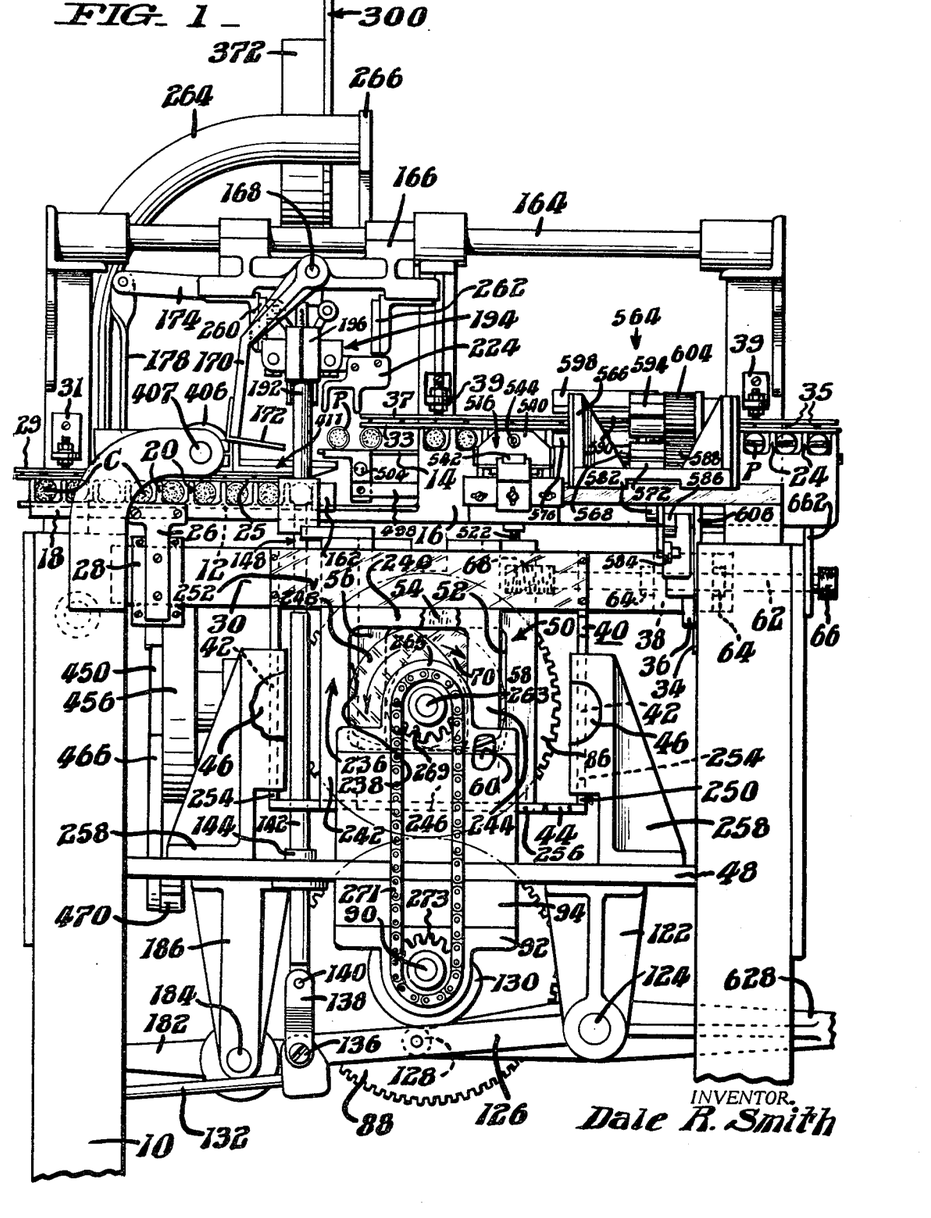
FIGURE 1 is a front elevation of the cigar overwrapping and banding machine, showing the machine at the end of a cigar advancing cycle, in which the heat sealing means for the folded ends of the wrapper are in the downstream shifted position.
Figure 2:
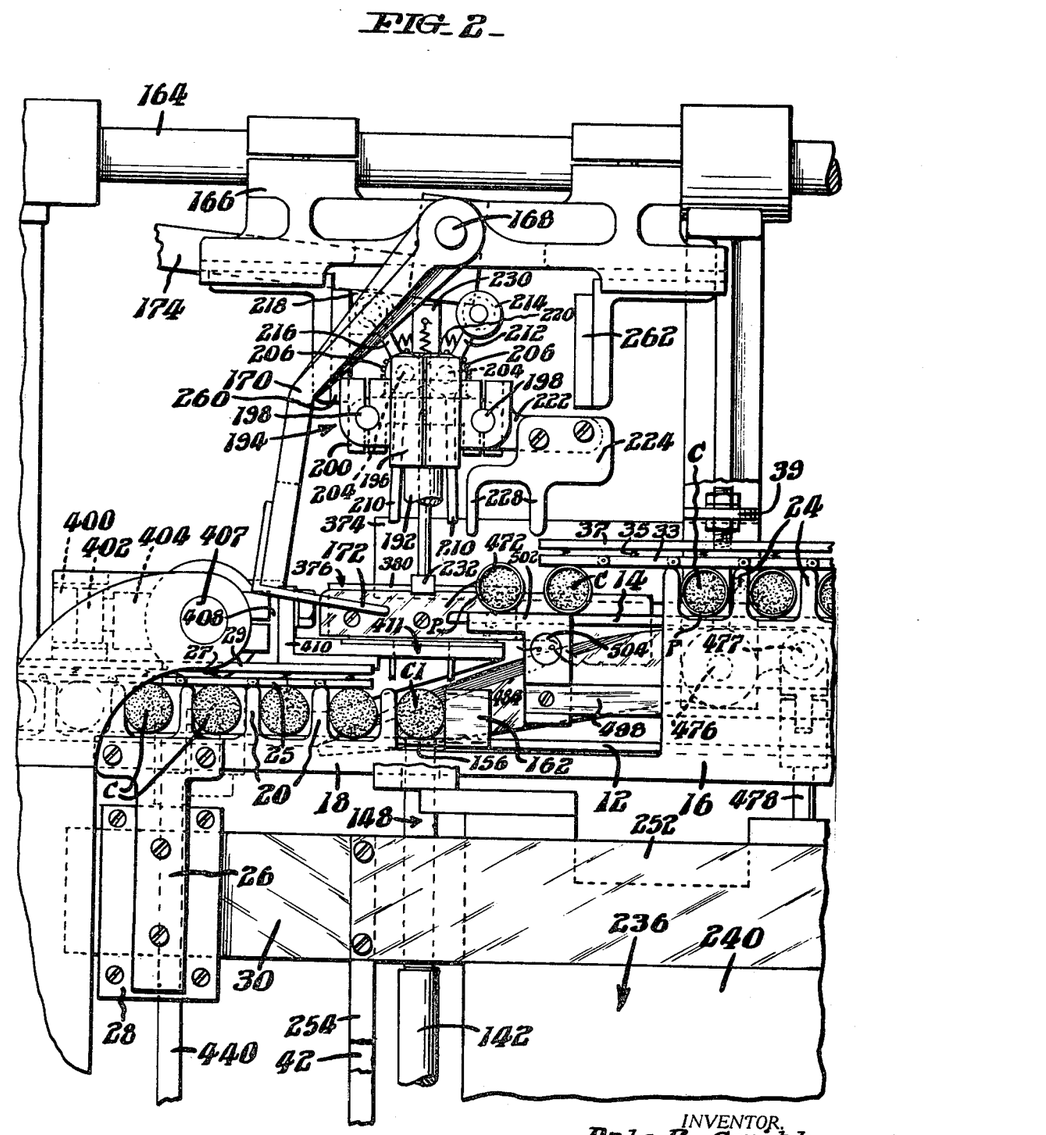
FIGURE 2 shows an area of FIGURE 1 to an enlarged scale, showing the means by which the cigars are elevated from the infeed platform to the discharge platform and showing that at the elevator position the cigars are provided with a wrapper material.
Figure 3:
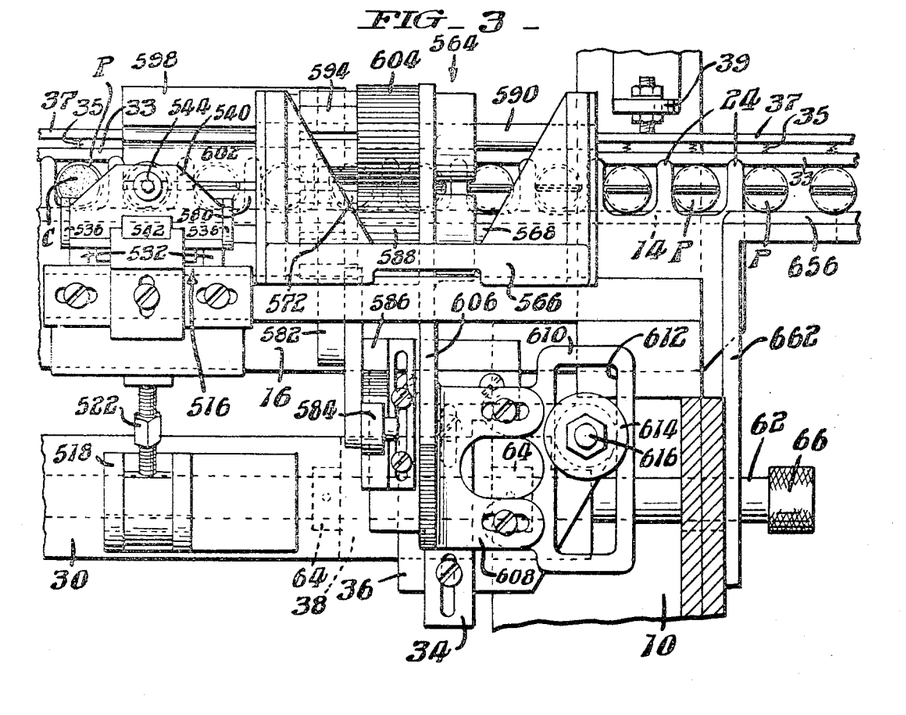
FIGURE 3 shows an area of FIGURE 1 to an enlarged scale, showing the cigars on the discharge platform and showing the wrapper end heat sealing unit in retracted position.
Figures 4, 5, 18:
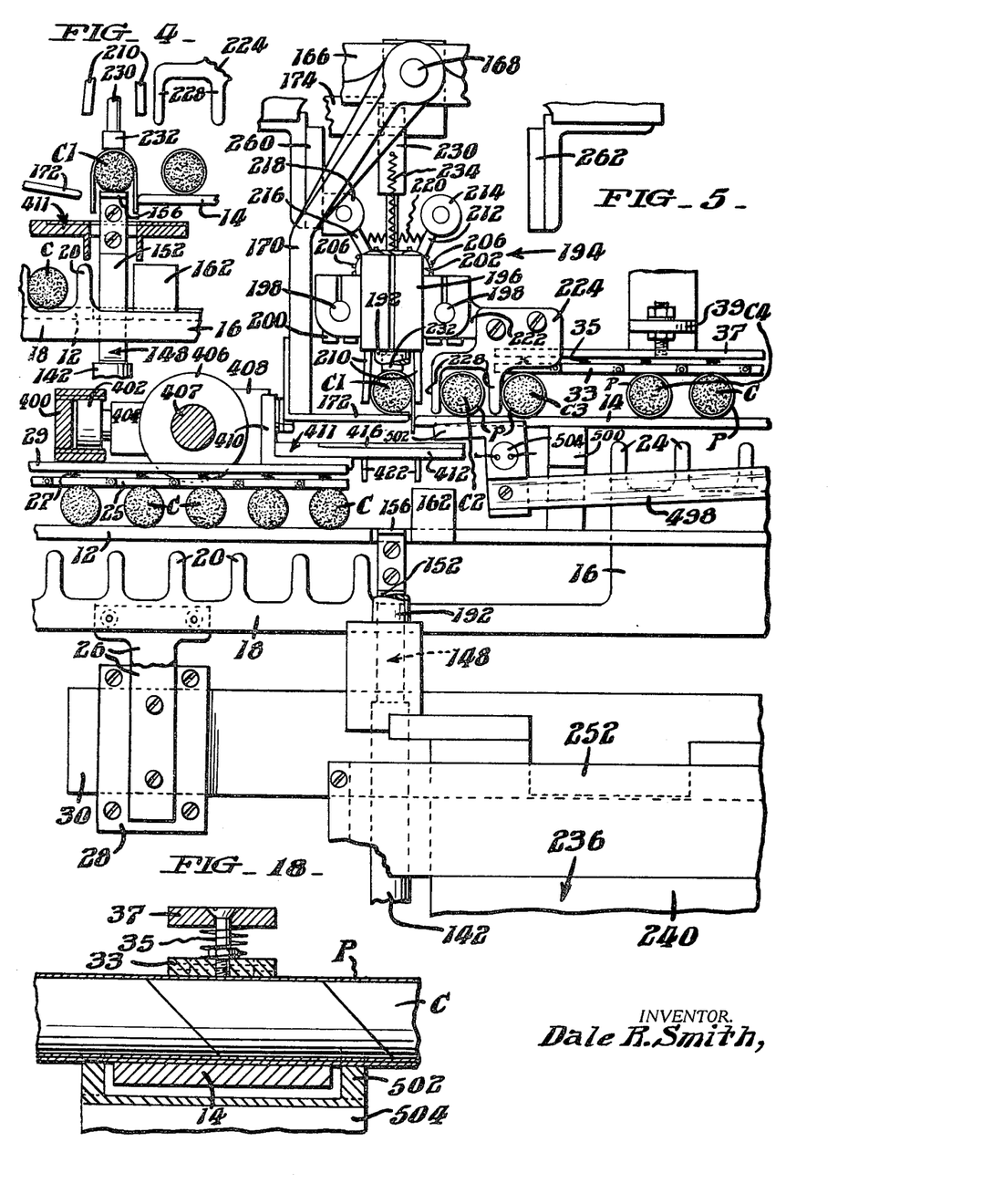
FIGURE 4 is a view showing a cigar with a wrapper draped thereover and elevated from the position shown in FIGURES 1 and 2.
FIGURE 5 is a view showing one side of the wrapper being folded under the cigar.
FIG. 18 shows the means for holding the cigar and preventing rotation thereof as it moves along the discharge rack.
Figures 6, 19:
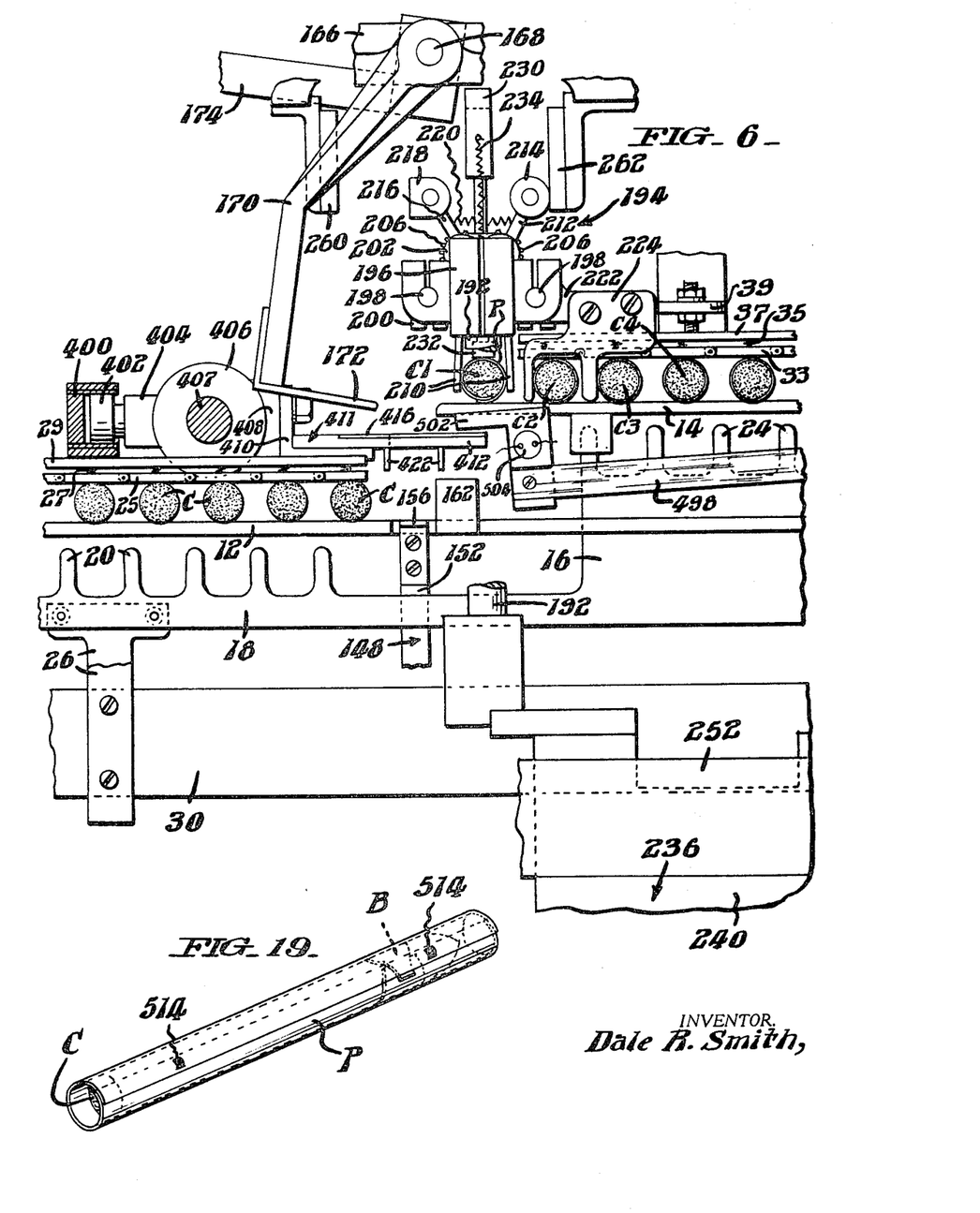
FIGURE 6 is a view showing the other side of the wrapper being folded under the cigar.
FIG. 19 shows the cigar with the wrapper folded thereabout before the projecting ends are end folded and sealed.
Figure 7:
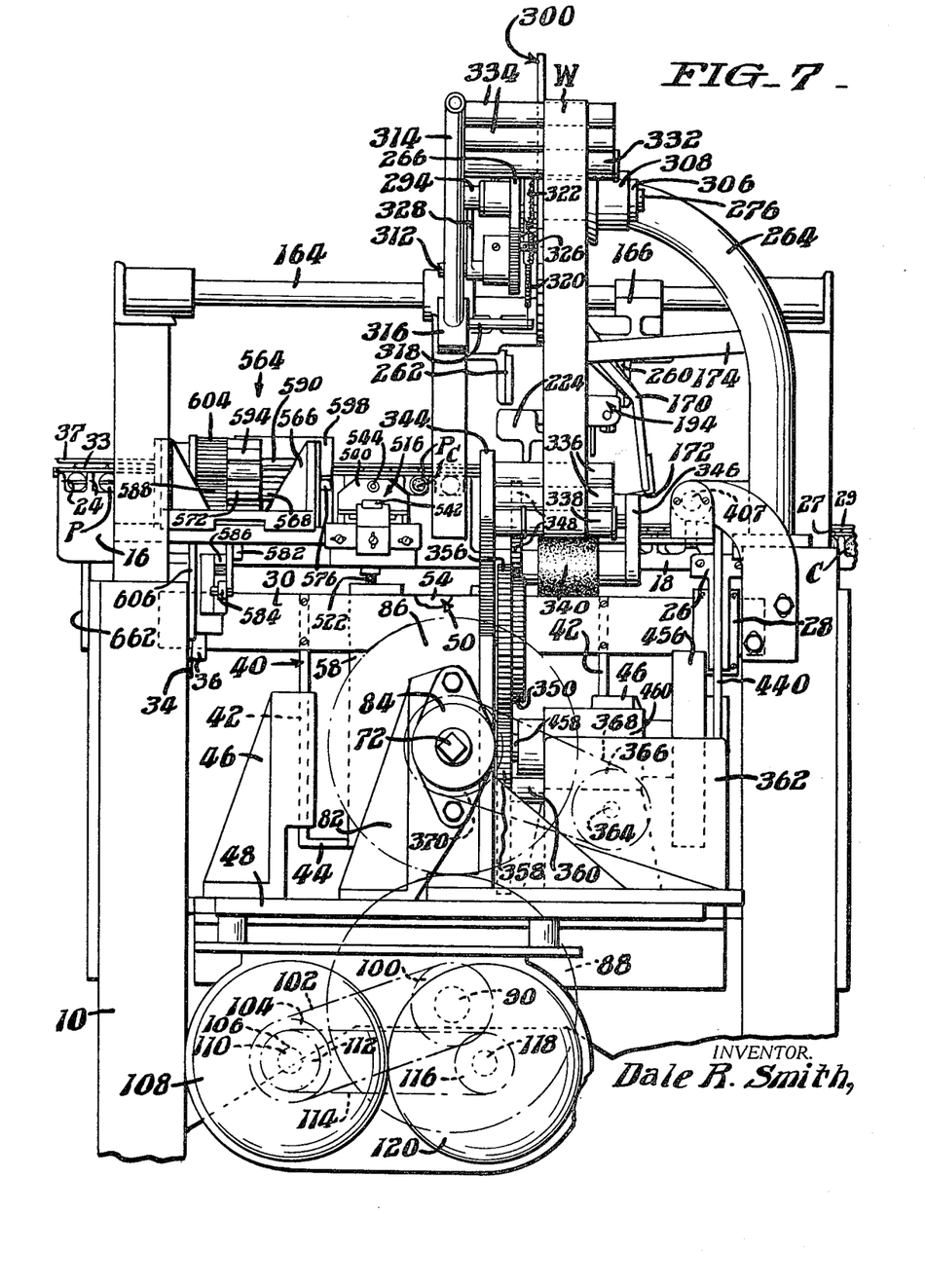
FIGURE 7 is a rear elevation of the machine.
Figure 8:
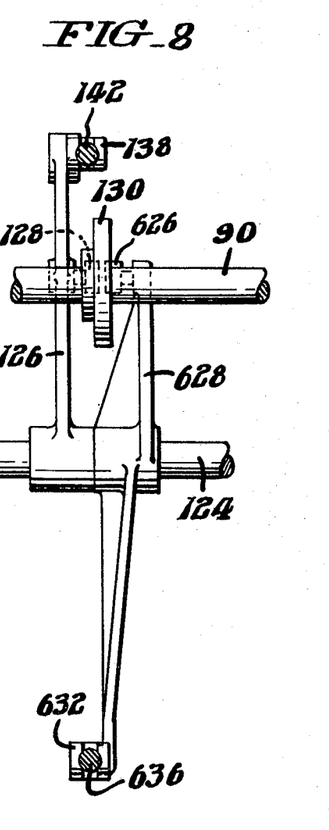
FIGURES 8–12 illustrate the means for heat sealing the overlapping marginal edges of the wrapper, as illustrated in FIG. 13.
Figures 9, 11:
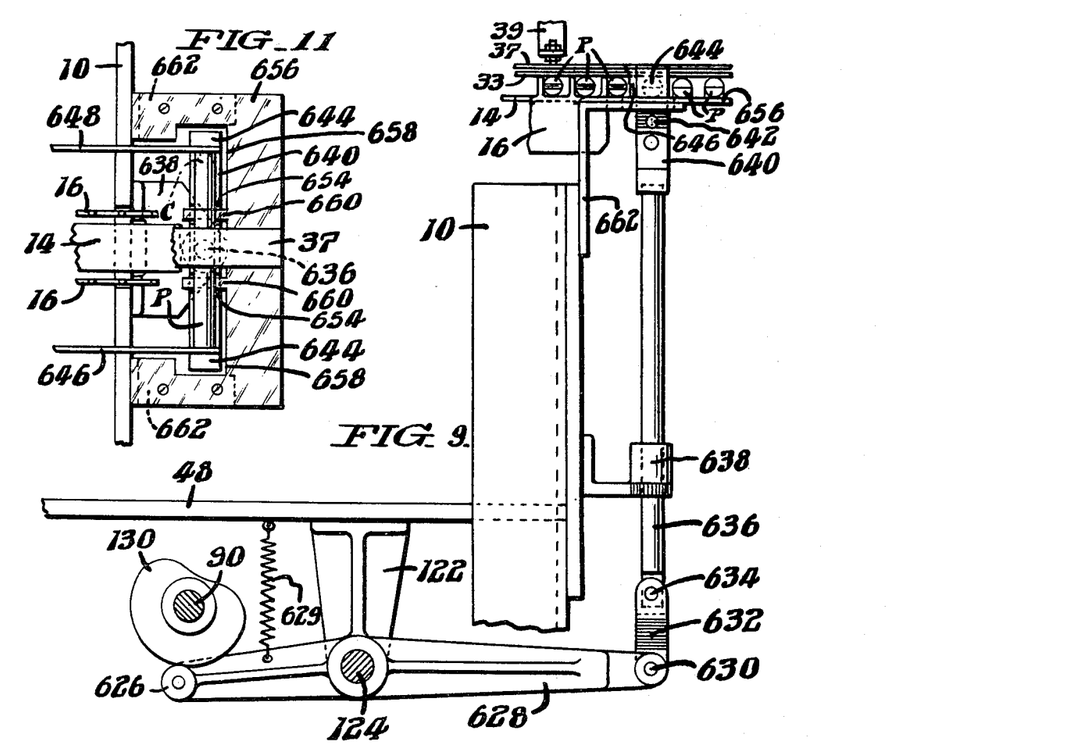
Figure 10:
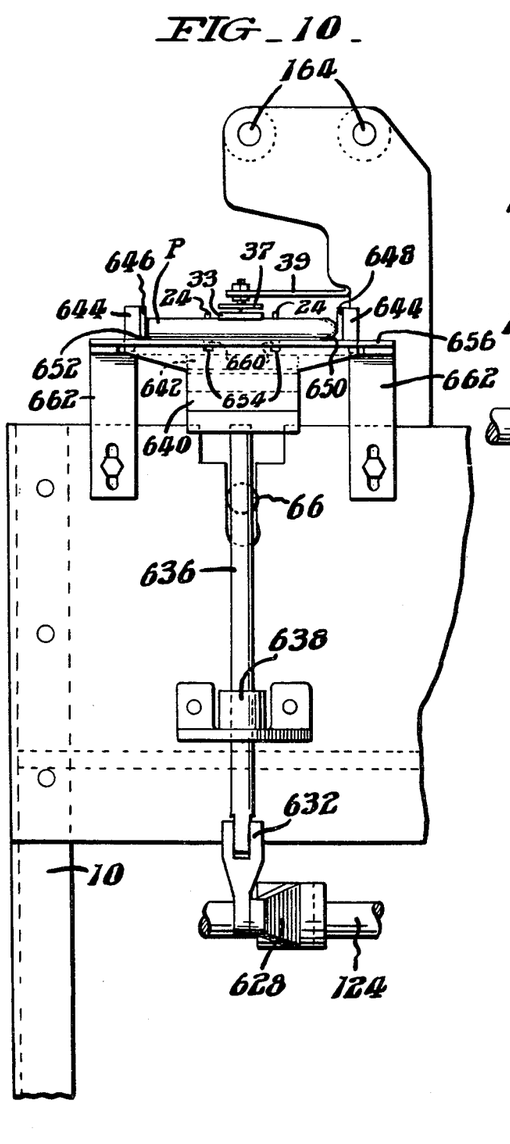
Figures 12, 13:
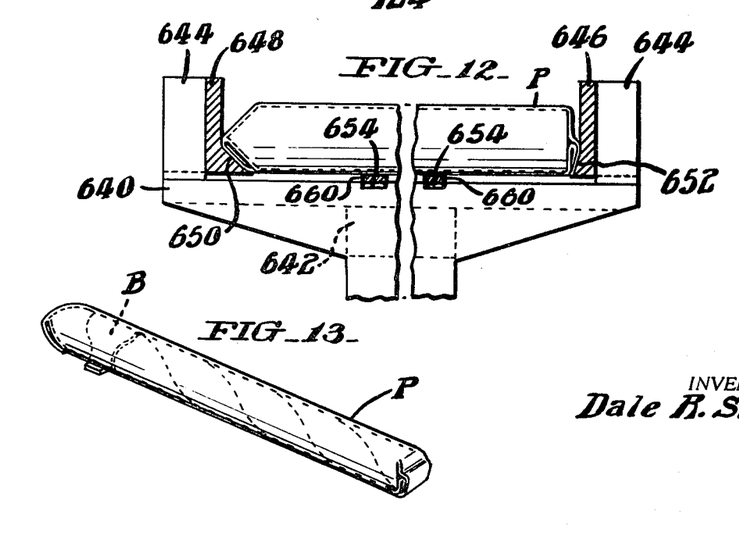

Cigars are advanced by the racks 16 successively to a position over the fingers 660 and the heater 640. Spring 629, urging lever 628 clockwise, keeps the roller 626 in contact with the cam 130. The cam 130 rocks arm 628, which reciprocates shaft 636. As each cigar is positioned over the heater 640, the latter rises and seals the overlapping marginal areas of the wrapper (FIGURE 13).

What is claimed is:
1. In a cigar overwrapping and banding machine having means for advancing a continuous succession of partially wrapped cigars along a discharge support platform, each cigar having a wrapper thereabout having a folded end projecting beyond each end of the cigar:
   (a) an end fold sealing station comprising end fold heat sealing means on opposite sides of said discharge support platform;
   (b) said end fold heat sealing means including sealing jaws and means for opening and closing said jaws vertically in timed relation with the advancement of said cigars;
   (c) said sealing jaws including an upstream section and a downstream section;
   (d) said upstream section of said jaws being shaped to engage said wrapper end fold and to form a horizontal heat seal thereof;
   (e) said downstream section being shaped to bend the horizontally sealed end fold formed by said upstream section into a generally vertical plane and to further heat seal said vertically disposed end fold seal.

2. Apparatus according to claim 1 characterized in that:
   (a) means are provided for closing the sealing jaws on a plurality of adjacent end folds at the same time and for advancing said jaws while closed on said plurality of end folds in the direction of and at the same speed as said advancing succession of cigars;
   (b) means are provided for opening said jaws at the conclusion of the advancement stroke and for returning said opened jaws to a start position upstream.

3. Apparatus according to claim 2 characterized in that the upstream and downstream sections of said sealing jaws are integrally adjacent.

4. Apparatus according to claim 3 characterized in that said upstream section of said sealing jaws is adapted to close on the end fold of one cigar at the same time that the downstream section of said sealing jaws closes on the end folds of two cigars next adjacent in the downstream direction.

References Cited
UNITED STATES PATENTS

| | | | |
|---|---|---|---|
| 1,964,020 | 6/1934 | Alm et al. | 53—373 |
| 2,037,080 | 4/1936 | Malocsay | 53—176 X |
| 2,090,448 | 8/1937 | Jahne et al. | 53—379 X |
| 2,760,317 | 8/1956 | Cornock et al. | 53—379 X |
| 3,343,336 | 9/1967 | Bradford | 53—329 |

THERON E. CONDON, Primary Examiner

R. L. SPRUILL, Assistant Examiner

U.S. Cl. X.R.
53—373